United States Patent
Mitchell

(10) Patent No.: US 9,492,015 B1
(45) Date of Patent: Nov. 15, 2016

(54) INFANT VEHICLE SEAT COVER

(71) Applicant: Lisa A. Mitchell, Montgomery, AL (US)

(72) Inventor: Lisa A. Mitchell, Montgomery, AL (US)

( * ) Notice: Subject to any disclaimer, the term of this patent is extended or adjusted under 35 U.S.C. 154(b) by 179 days.

(21) Appl. No.: 14/255,566

(22) Filed: Apr. 17, 2014

Related U.S. Application Data

(60) Provisional application No. 61/813,831, filed on Apr. 19, 2013.

(51) Int. Cl.

| | |
|---|---|
| *E04H 15/02* | (2006.01) |
| *E04H 15/38* | (2006.01) |
| *B60N 2/28* | (2006.01) |
| *A47C 7/66* | (2006.01) |
| *A47D 15/00* | (2006.01) |
| *E04H 15/48* | (2006.01) |
| *E04H 15/58* | (2006.01) |

(52) U.S. Cl.
CPC ............... *A47C 7/66* (2013.01); *A47D 15/00* (2013.01); *B60N 2/2839* (2013.01); *E04H 15/02* (2013.01); *E04H 15/38* (2013.01); *E04H 15/48* (2013.01); *E04H 15/58* (2013.01)

(58) Field of Classification Search
CPC .............. E04H 15/02; E04H 15/38; E04H 15/48; E04H 15/58; B60N 2/2839; A47C 7/66
USPC ............ 297/184.11, 184.13, 184.14, 184.17
See application file for complete search history.

(56) References Cited

U.S. PATENT DOCUMENTS

| | | | | |
|---|---|---|---|---|
| 4,343,322 A | * | 8/1982 | Fiddler | E04F 10/04 135/133 |
| 4,506,689 A | * | 3/1985 | Fiddler | A47C 7/66 135/117 |
| 4,639,036 A | * | 1/1987 | Nichols | A47C 7/62 248/230.2 |
| 5,184,865 A | * | 2/1993 | Mohtasham | B62B 9/142 135/133 |
| 5,188,380 A | * | 2/1993 | Tucek | B62B 7/145 135/88.02 |
| 5,551,745 A | * | 9/1996 | Huang | B60J 7/1282 135/133 |
| 6,039,393 A | | 3/2000 | Roh | |
| 6,056,355 A | | 5/2000 | Klassen | |
| 6,209,953 B1 | | 4/2001 | Mackay et al. | |
| 6,217,099 B1 | * | 4/2001 | McKinney | B62B 9/142 160/89 |
| 6,481,791 B1 | | 11/2002 | Facchini et al. | |
| 6,517,153 B1 | | 2/2003 | Brewer | |
| 7,083,228 B1 | | 8/2006 | Al Sawan | |
| 7,118,173 B2 | * | 10/2006 | Kassai | B62B 9/14 135/133 |
| 7,150,499 B2 | | 12/2006 | McGregor | |

(Continued)

*Primary Examiner* — David R Dunn
*Assistant Examiner* — Danielle Jackson
(74) *Attorney, Agent, or Firm* — Robert C. Montgomery; Montgomery Patent & Design, LLC

(57) ABSTRACT

An infant car seat cover is adapted to be attached to an existing infant car seat and is configured to extend over the surface thereof creating an enclosed internal cavity. The cover has an interior mesh surface, which is selectively covered by a protective exterior surface. Additionally, the interior and exterior surfaces are supported by pivotally attached support frames, which define an internal cavity for the infant to occupy. When fully extended over the surface of the car seat, the cover is capable of opening at multiple points, allowing various access and breathability configurations.

6 Claims, 6 Drawing Sheets

(56) References Cited

U.S. PATENT DOCUMENTS

| | | | | |
|---|---|---|---|---|
| 7,360,772 B2* | 4/2008 | Koch | ................... | B62B 9/142 |
| | | | | 280/304.1 |
| 7,891,732 B2* | 2/2011 | Hei | ................... | A47C 7/66 |
| | | | | 297/184.13 |
| 8,011,727 B1 | 9/2011 | Martinez | | |
| 8,287,038 B2* | 10/2012 | Henderson | ................ | B62B 9/142 |
| | | | | 280/47.38 |
| 2012/0062001 A1* | 3/2012 | Krasley | ................ | B60N 2/2845 |
| | | | | 297/184.13 |

* cited by examiner

INFANT VEHICLE SEAT COVER

RELATED APPLICATIONS

The present invention was first described in and claims the benefit of U.S. Provisional Application No. 61/813,831, filed Apr. 19, 2013, the entire disclosures of which are incorporated herein by reference.

FIELD OF THE INVENTION

The present invention relates to an apparatus that provides a retractable enclosure for an infant vehicle seat to provide a permutation of protective layers from harsh environmental exposure for an infant seated within.

BACKGROUND OF THE INVENTION

Infants are delicate little beings that require the utmost care in order to protect, and keep them safe from harm. As a result, there are a myriad of products intended to provide protection from the danger generated by a variety of sources. Perhaps the most common item that comes to mind when thinking of infant safety is that of the car seat. Such car seats securely hold the infant in place, protect them while being transported, and allow them to be moved from place to place with relative ease. However, as such car seats are often used outside, the child is often exposed to inclement weather such as rain, snow, cold temperatures, bright sunshine, and even flying insects. The only protection that a parent or care provider can offer is that of a blanket which completely covers the child. Unfortunately, this solution may cause the child to overheat, or not permit adequate air flow to allow breathing. Accordingly, there exists a need for a means by which a child inside a car seat can be protected from environmental hazards, without the dangers of present solutions. The development of the seat cover fulfills this need.

The invention is a protective cover for an infant seated in a car seat, which comprises a lower member and an upper member supported by attachment clamps. The clamps secure the lower member to a lower portion of the car seat and the upper member to an upper portion of the car seat. Each lower member and upper member is "U"-shaped frame jointed together by two (2) pivot joints. There is also a plurality of retraction frames, each having a similar "U"-shape that fit within the lower member and upper member configurations, and are also rotatingly affixed via the two (2) pivot joints. Each set of retraction frames provides for a different type and degree of cover. Each set of retraction frame is connected to enable independent rotation of each set of retraction frame, and extends up and over the top of the car seat when rotated.

These sets of retraction frames support varying textile coverings such as polyester cotton and/or a mesh material. The retraction frames can be completely closed or opened. When open, easy access is granted to place and/or remove the child. When closed, the child is provided with a desired type of protection from the outside environment. These features provide protection from rain, insects, cold weather, extreme sunlight, or other hazards, which can be detrimental to the child's well-being.

Prior art in this field consists of car seat covers that rotate up and over the top of the car seat. However, these coves are integral to the car seat and do not provide a user with a permutation of cover types and degrees of protection for the child seated within. Some prior art car seat covers are removable from the car seat, but these are in the form of casings or zip up tent-like structures. These removable covers have flap openings instead of rotating members to provide coverings to a child held within. Furthermore, these removable covers still suffer from not providing a permutation of cover types and degrees of protection.

It is an objective of the present invention to provide a system of covers that can rotate to varying angles to provide shade and cover to a child seated within a car seat.

It is a further objective of the present invention to enable independent rotation of each of the covers to allow a user to provide a desired type and degree of protection.

It is a further objective of the present invention to enable removable attachment to the system to any car seat.

SUMMARY OF THE INVENTION

The present invention is a car seat cover system comprising a frame rotatingly connected by two (2) pivot joints. Within the frame there are a plurality of primary retraction bars and a plurality of secondary retraction bars that are also rotatingly connected to the two (2) pivot joints. The frame comprises two (2) "U"-shaped members, an upper member and a lower member, that form a general rectangular shape when rotated about the pivot joints to be substantially coplanar. The plurality of primary retraction bars has a nested configuration by which each primary retraction bar forms a "U"-shaped member able to fit within an inner space defined by a planar region of the upper member. Additionally, the plurality of secondary retraction bars has a nested configuration by which each secondary retraction bar forms a "U"-shaped member able to fit within an inner space defined by a planar region of the plurality of primary retraction bars. The pivot joints are configured to enable independent rotation of the upper member, lower member, primary retraction bars, and secondary retraction bars.

The upper and lower members are connected to upper and lower portions of a car seat, respectively, where each upper and lower member is connected to the car seat via at least one attachment mechanism. A first cover is attached to the plurality of primary retraction bars forming a first enclosure. A second cover, preferably a mesh material, is attached to the plurality of secondary retraction bars forming a second enclosure. Once attached to a car seat, the primary and secondary retraction bars can be rotated to provide a desired level of protection and cover for an infant seated within.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
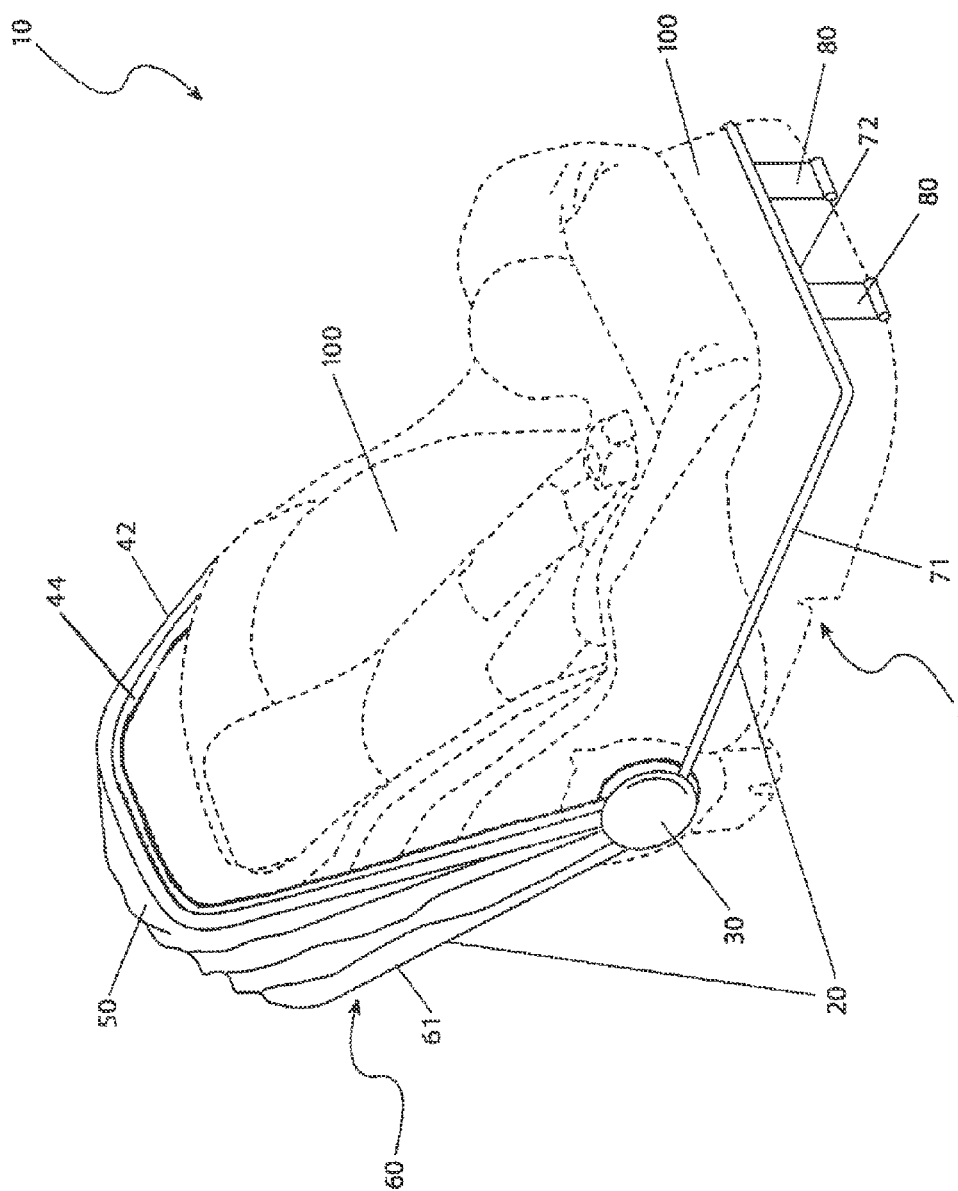
FIG. 1 is an environmental view of a vehicle seat cover system 10 depicted with the cover system 10 in a retracted position in accordance with the preferred embodiment of the present invention.

DESCRIPTIVE KEY 10 seat cover
20 frame
30 pivot joint
31 first disk
32 shaft
35 second disk
36 second disk aperture
38a primary bar aperture
38b secondary bar aperture
42 primary retraction bar
43 primary lateral member
44 primary cross member
46 secondary retraction bar
47 secondary lateral member
48 secondary cross member
49a primary bar pivot
49b secondary bar pivot
50 main enclosure
60 upper member
61 upper lateral member
62 upper cross member
70 lower member
71 lower lateral member
72 lower cross member
80 attachment mechanism
90 screen enclosure
100 vehicle seat

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a vehicle seat 100 cover system (herein described as the "system") 10, which provides a means to afford a selection of retractable covers for an infant vehicle seat 100, and protect an infant seated within from certain environmental exposures.

Figure 5:
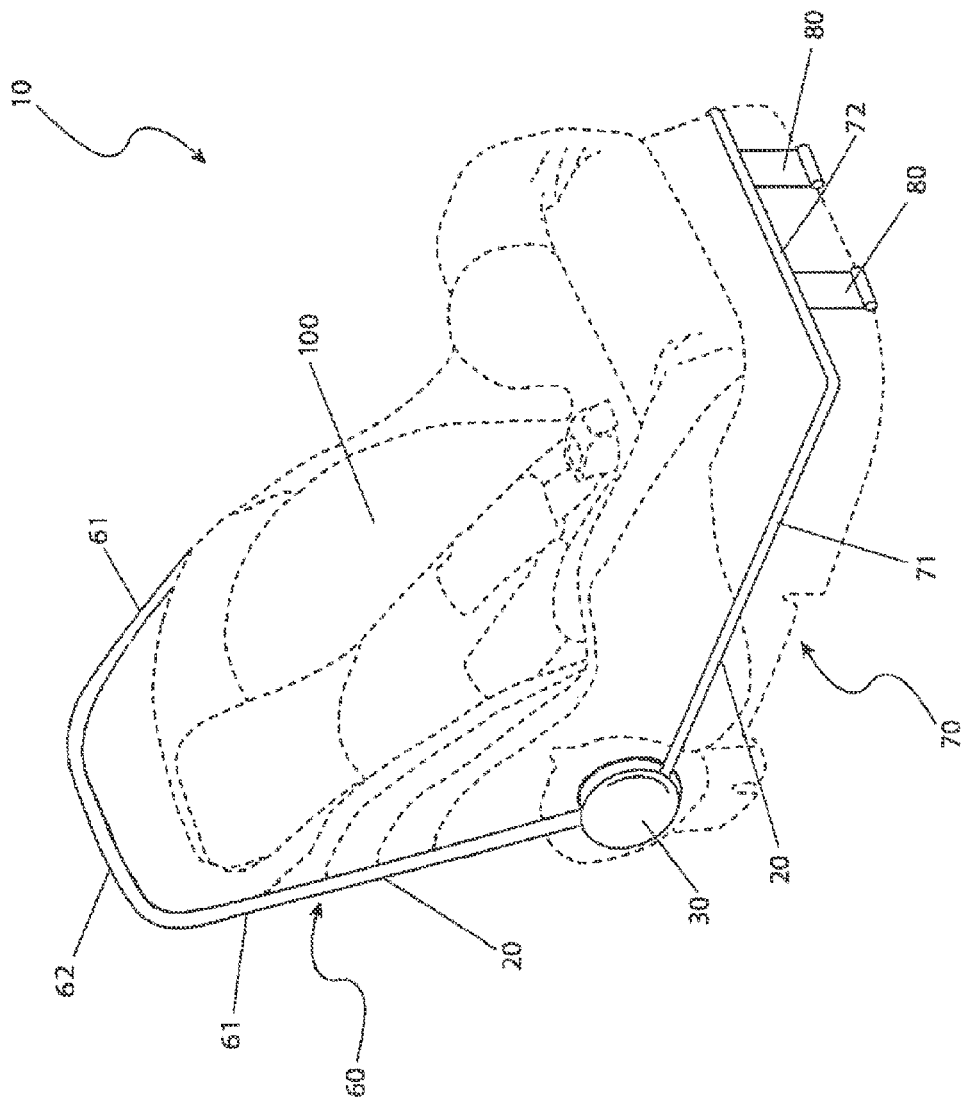
FIG. 5 is an isolated view of a frame 20 of the system 10 in accordance with the preferred embodiment of the present invention.

Referring now to FIG. 1, an environmental view of the system 10 in a retracted arrangement on a vehicle seat 100, and FIG. 5, an isolated view of the frame 20, according to the preferred embodiment of the present invention, are disclosed. The system 10 includes a frame 20 with two (2) pivot joints 30, a main enclosure 50 having primary retraction bars 42, and a screen enclosure 90 having secondary retraction bars 44. The frame 20, as illustrated in FIG. 5, is configured to be a pivoting rectangular structure having an upper member 60 and a lower member 70 connected at pivot joints 30. The upper member 60 is preferably an elongated "U"-shaped structure having an upper cross member 62 and a pair of upper lateral members 61. Similarly, the lower member 70 is a mirrored elongated "U"-shaped structure having a lower cross member 72 and a pair of lower lateral members 71. The lateral members 61, 71 of the upper member 60 and of the lower member 70 are in mechanical connection with each other by means of a pair of pivot joints 30. Each pivot joint 30 enables the upper member 60 and the lower member 70 to rotate about an axis defined by the pivot joints 30 so that the upper member 60 and lower member 70 have a range of motion to form angles between each other ranging from zero degrees (0°) to approximately one-hundred eighty degrees (180°). While in a position of a one-hundred eighty degree (180°) angle of separation, the two (2) members form an oblong substantially in a shape of a rectangle. The frame 20 is preferably composed of a rigid, tubular thermoplastic material; however it is understood that other materials, or other polymers having a different cross-sectional shape, may be utilized without limiting the scope of the system 10.

Figure 7:
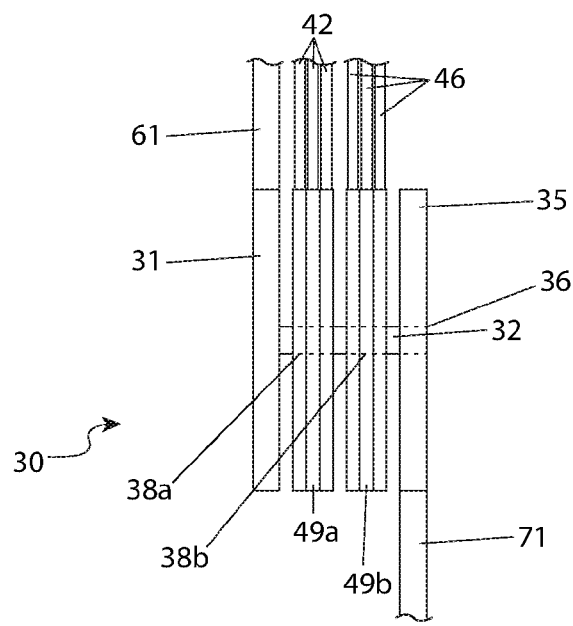

Referring now to FIG. 7, each pivot joint 30 is configured to have a circular first disk 31 formed at the free end, or permanently fixed upon the free ends, of the lateral members 61 of the upper member 60. The first disk has an attached cylindrical shaft 32 at the center thereof to be engaged into a centrally located second disk aperture 36 in a similar circular second disk 35 formed, or otherwise affixed to, the corresponding free ends of each lateral member 71 of the lower member 70.

In use, the system 10 is employed with an existing vehicle seat 100. The upper member 60 and the lower member 70 are rotated about the pivot joints 30 to widen an angle of separation such that the upper member 60 makes contact with an upper portion of the vehicle seat 100 and the lower member 70 makes contact with a lower portion of the vehicle seat 100. A plurality of attachment mechanisms 80 is used to secure the upper member 60 to an upper portion of the vehicle seat 100 and the lower member 70 to a lower portion of the vehicle seat 100. Due to the variability of existing vehicle seats 100 the attachment mechanism 80 may be configured as spring clamps having a pair of jaws and a pair of handles connected with a rotatable joint in some embodiments and user-installed hardware, such as snaps, in other embodiments. It is understood that other devices, such as a strap with an engaging hook, may be utilized without limiting the scope of the system 10.

Simultaneously attached at the pivot joints 30 is a plurality of nested primary retraction members 42 connected to the main enclosure 50 and a separate plurality of nested secondary retraction bars 44 connected to the screen enclosure 90. Each retraction bar 42, 44 is rotated about the shaft of the pivot joints 30 to create an approximate zero degree (0°) angle of separation between each set of retraction bars 42, 44 and the upper member 60 so as to create an opening for placing an occupant into a seating area of the vehicle seat 100 or removing the occupant therefrom. The engaging ends of each lateral member of the primary retraction bars 42 and secondary retraction bars 44 have respective primary bar pivots 49a and secondary bar pivots 49, each of which are configured to include an aperture 38a, 38b defined by an inner surface complimentary to the periphery of the shaft 32 of the first disk 31 of each pivoting joint 30 whereby the aperture 38a, 38b may axially receive the shaft 32.

Figure 2:
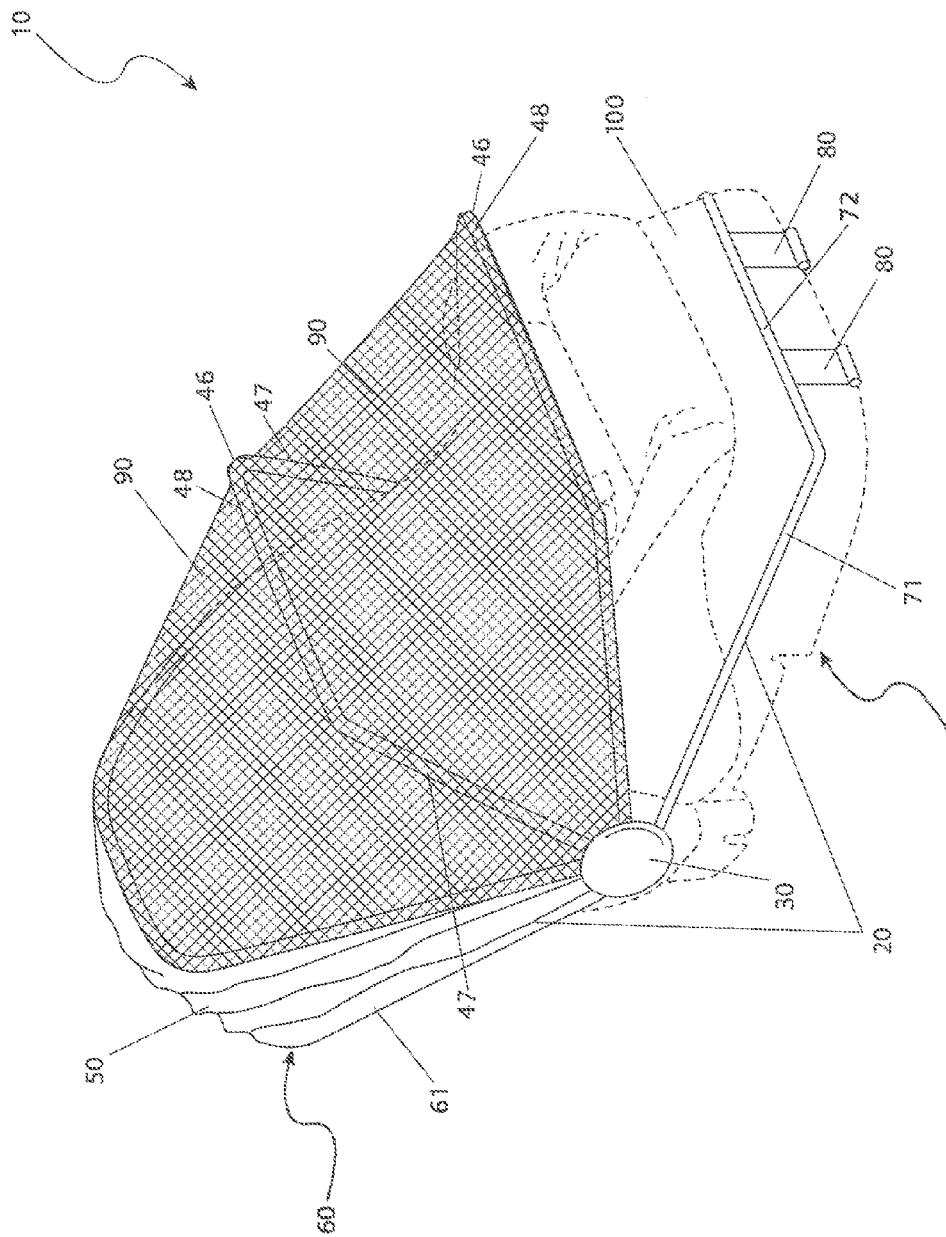
FIG. 2 is an environmental view of the system 10 illustrated with a screened enclosure 90 deployed in accordance with the preferred embodiment of the present invention.
Figure 3:
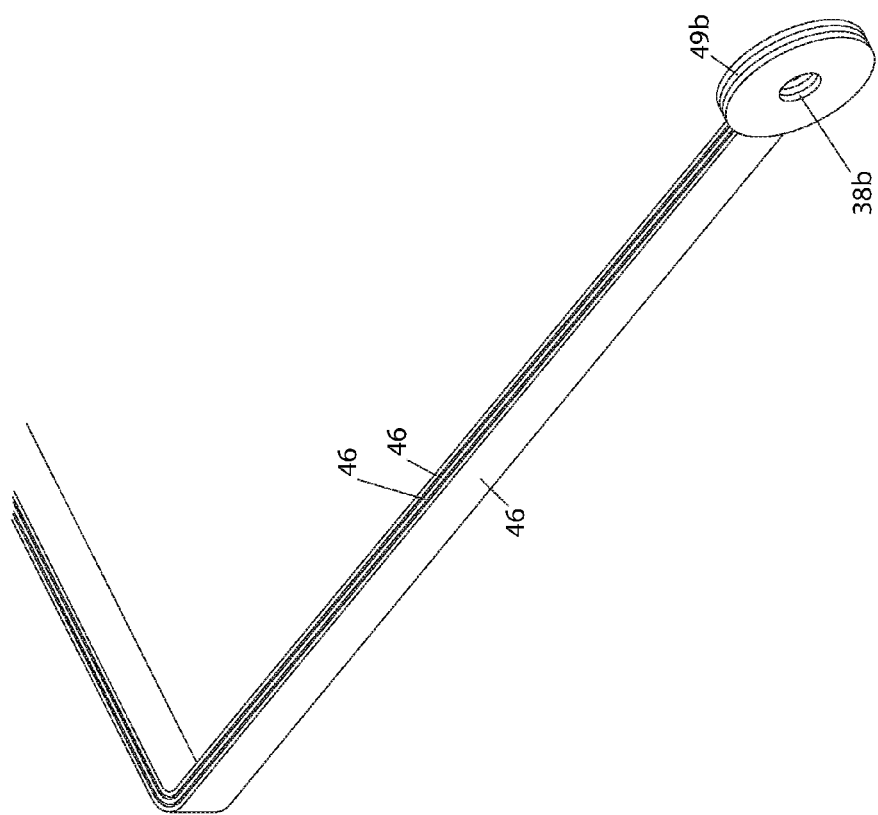
FIG. 3 is an isolated view of a secondary bar pivot 49b of the secondary retraction bars 44 of the system 10 in accordance with the preferred embodiment of the present invention.

Referring now to FIG. 2, an environmental view of the system 10, illustrated with the screen enclosure 90 deployed, according to the preferred embodiment of the present invention, is disclosed. Each secondary retraction bar 46 is substantially a similar "U"-shaped configuration as the upper member 60 of the frame 20, having a pair of secondary lateral members 47 and a cross member 48, but of a shorter perimeter length so as to allow each secondary retraction bar 46 to fit within an inner space defined by a planar region of the upper member 60. Preferably more than one (1) secondary retraction bar 46 is provided, and each successive secondary retraction bar 46 has a shorter perimeter length than the previous secondary retraction bar 46 so that each additional secondary retraction bar 46 can be nested within an inner space defined by a planar region of a previous secondary retraction bar 46. The cross section of the secondary retraction bars 44 is preferably a wide rectangle so as to have a much greater depth than the thickness as seen on FIG. 3. The secondary lateral members 47 of each secondary retraction bar 46 have secondary bar pivots 49b that are supported on the cylindrical shaft of the pivot joints 30. Each secondary retraction bar 46 is able to pivot independently of the upper member 60 and lower member 70 about the pivot joints 30. When each secondary retraction bar 46 forms a zero degree angle (0°) of separation with the upper member 60, all secondary retraction bars 44 fit within an inner space defined by a planar region of the upper member 60.

The screen enclosure 90 is attached first to the upper member 60 along the upper cross member 62 and the pair of upper lateral members 61 and then in turn to the secondary cross member 47 and the secondary lateral members 48 of each secondary retraction bar 46 beginning with the outermost secondary retraction bar 46 and ending with the innermost secondary retraction bar 46 of the nested set such that the secondary retraction bars 44 are approximately evenly spaced. The screen enclosure 90 may also be affixed, as by stitching with a natural or a synthetic thread, to the main enclosure at, or near, the juncture between the main enclosure 50 and the upper member 60. The screen enclosure 90 is preferably a nylon mesh having an open area appropriate to isolate an occupant of the vehicle seat 100 from certain insects. It is understood that other materials forming a mesh or netting may be utilized without limiting the scope of the system 10. A user may extend the screen enclosure 90 to a fully deployed position such that the angle of separation between the innermost secondary retraction bar 46 and the lower member 70 is zero degrees (0°) while maintaining a retracted position for the main enclosure 50. A fastening means may be employed to secure the screen enclosure 90 in the fully deployed position or the friction inherent in the configuration of the secondary bar pivot 49b of the secondary retraction bars 44 may be sufficient to achieve comparable results without limiting the scope of the system 10.

Figure 4:
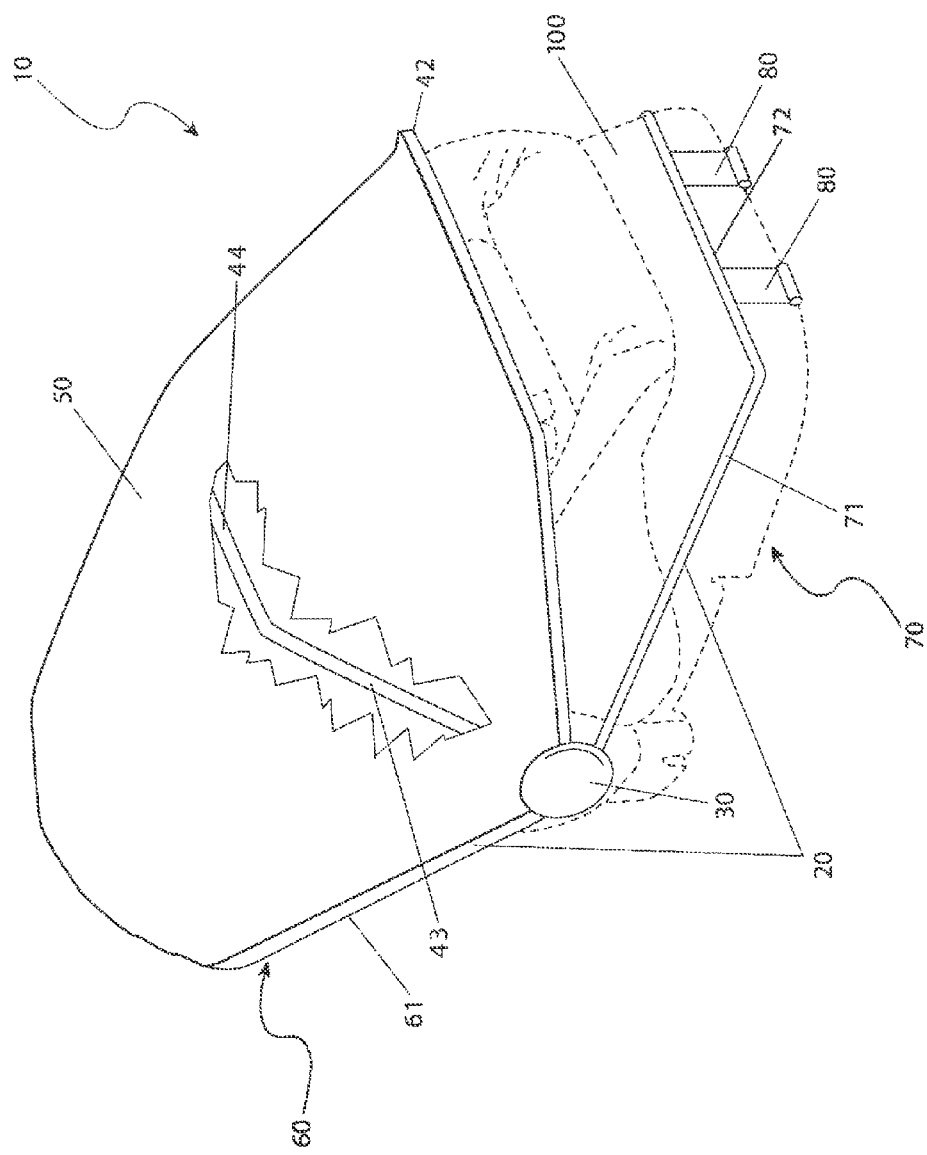
FIG. 4 is an environmental view of the system 10 with a main enclosure 50 deployed in accordance with the preferred embodiment of the present invention.

Referring now to FIG. 4, an environmental view of the system 10, with the main enclosure 50 according to the preferred embodiment of the present invention, is disclosed. The primary retraction bars 42 are configured to be similar to the secondary retraction bars 44 with the exception that while the perimeter length of the primary retraction bars 42 is such as to a fit within an inner space defined by a planar region of the upper member 60, the secondary retraction bars 44 have a perimeter length so as to fit within an inner space defined by a planar region of the primary retraction bars 42. The main enclosure 50 is attached first to the upper member 60 along the upper cross member 62 and the pair of upper lateral members 61 and then in turn to the primary cross member 44 and the primary lateral members 43 of each primary retraction bar 42 beginning with the outermost primary retraction bar 42 and ending with the innermost primary retraction bar 42 of the nested set such that the primary retraction bars 42 are approximately evenly spaced in relation to the main enclosure 50.

Figure 6:
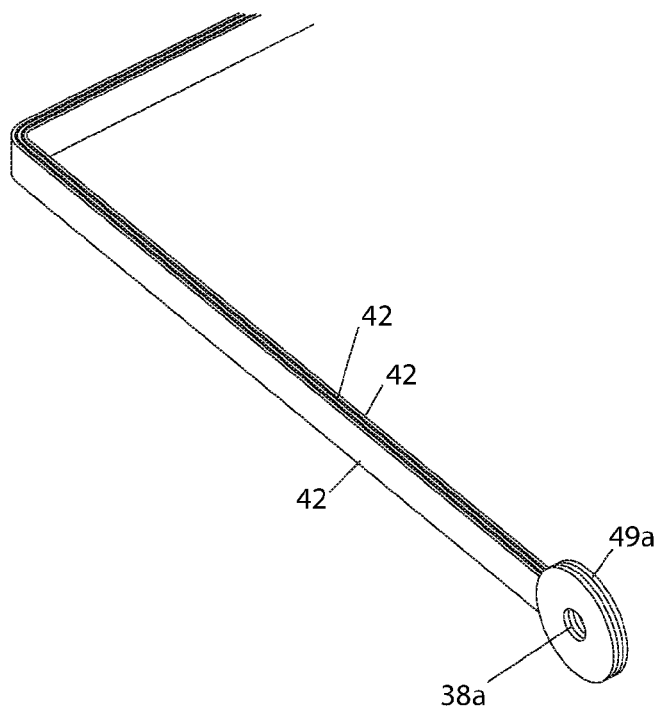
FIG. 6 is an isolated view of a primary bar pivot 49a of the primary retraction bars 42 of the system 10 in accordance with the preferred embodiment of the present invention; and, FIG. 7 is an isolated view of the pivot joint 30 of the system 10 in accordance with the preferred embodiment of the present invention.

Referring now to FIG. 6, which illustrates the primary bar pivots 49a of the primary retraction bars 42. As described above, the primary retraction bars 42 are configured to be similar to the secondary retraction bars 46. As such, the friction inherent in the configuration of the primary bar pivot 49a of the primary retraction bars 42 may be sufficient to achieve comparable results without limiting the scope of the system 10.

The main enclosure 50 is preferably composed of a cotton material, which may be any of various styles, colors, or patterns, attached in an approximately even pattern to the periphery of each primary retention bar 42. The main enclosure 50 may additionally be lined with a material to provide some insulative or other protective value. It is understood that other materials may be utilized in the fabrication of the main enclosure 50 without limiting the scope of the system 10. In reaction to environmental exposure conditions, such as rain, sun, or wind, a user may rotate a primary retraction bar 42 from its approximate zero degree (0°) angle of separation between the upper member 60 so that it makes contact with the lower member 70 and encapsulates the infant within the main enclosure 50.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by an enabled individual in a simple and straightforward manner with little or no training. After initial purchase or acquisition of the system 10, it would be installed as indicated in FIG. 1.

The method of installing and utilizing the system 10 may be achieved by performing the following steps: acquiring a model of the system 10 having a desired style to suit the taste of a user; manipulating the upper member 60 and the lower member 70 about the pivot joints 30 to widen an angle of separation to make contact with upper and lower portions of a vehicle seat 100; employing the plurality of attachment mechanisms 80 to secure the frame 20 to a perimeter edge of the vehicle seat 100; manipulating each retraction bar 42, 44 about the pivoting joints 30 to lessen an angle of separation between each retraction bar 42, 44 and upper member 60 so as to create an opening for ingress and egress into a seating area of the vehicle seat 100; placing an infant in the seating area of the vehicle seat 100; employing a permutation of main enclosure 50 or screen enclosure 90 by pivoting the preferred retraction bars 42, 44 to widen an angle of separation between the retraction bar 42, 44 and the upper member 60, thereby enclosing an infant within the desired main enclosure 50 or screen enclosure 90.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A retractable enclosure, comprising:
   a frame, comprising:
      an upper member having an upper member cross bar conjoined with a first upper member lateral and a second upper member lateral forming an upper member planar region between said upper member cross bar, said first upper member lateral, and said second upper member lateral; and,
      a lower member having a lower member cross bar conjoined with a first lower member lateral and a second lower member lateral;
   a primary retraction bar, comprising:
      a plurality of nested primary retraction members, each having a primary retraction bar cross member conjoined with a first primary retraction bar lateral and a second primary retraction bar lateral;
      wherein each successive primary retraction member has a shorter perimeter length than that of a previous primary retraction member so that each additional primary retraction member nests within an inner space defined by a planar region of a previous primary retraction member;
      wherein a primary retraction member having a shortest perimeter length forms a primary retraction bar planar region between said shortest primary retraction bar cross member, said shortest first primary retraction bar lateral, and said shortest second primary retraction bar lateral; and,
      wherein each primary retraction bar is configured to fit within said upper member planar region;
   a secondary retraction bar, comprising:
      a plurality of nested secondary retraction members, each having a secondary retraction bar cross member conjoined with a first secondary retraction bar lateral and a second secondary retraction bar lateral;
      wherein each successive secondary retraction member has a shorter perimeter length than that of a previous secondary retraction member so that each additional secondary retraction member nests within an inner space defined by a planar region of a previous secondary retraction member; and,
      wherein said secondary retraction bar is configured to fit within said primary retraction bar planar region;
   a first pivot joint comprising a first shaft to rotatingly attach said first upper member lateral, said first lower member lateral, each first primary retraction bar lateral, and each first secondary retraction bar lateral to each other;
   a second pivot joint comprising a second shaft to rotatingly attach said second upper member lateral, said second lower member lateral, each second primary retraction bar lateral, and each second secondary retraction bar lateral to each other;
   a main enclosure affixed to said upper member and said primary retraction bar; and,
   a screen enclosure affixed to said upper member and said secondary retraction bar;
   wherein said first and second pivot joints are configured to enable independent rotation of said upper member, said lower member, said primary retraction bar, and said secondary retraction bar about an axis defined by said first and second shafts;
   wherein said frame is configured to be placed upon a top surface of a child car seat so that said upper member rests upon an upper portion of said child car seat and said lower member rests upon a lower portion of said child car seat;
   wherein rotation of said primary retraction bar enables selective envelopment of a seated region of said child car seat with said main enclosure; and,
   wherein rotation of said secondary retraction bar enables selective envelopment of said seated region of said child car seat with said screen enclosure.

2. The retractable enclosure recited in claim 1, wherein said first pivot joint comprises:
   a first disk disposed at a distal end of said first upper member lateral, wherein said shaft extends away from a central location thereof; and,
   a second disk disposed at a distal end of said first lower member lateral, having a second disk aperture;
   wherein said shaft passes through primary bar apertures of each of said first primary retraction bar lateral and secondary bar apertures of each of said first secondary retraction bar lateral, and engages said second disk aperture.

3. The retractable enclosure recited in claim 1, wherein said second pivot joint comprises:
   a first disk disposed at a distal end of said second upper member lateral, wherein said shaft extends away from a central location thereof; and,
   a second disk disposed at a distal end of said second lower member lateral, having a second disk aperture;
   wherein said shaft passes through primary bar apertures of each of said second primary retraction bar lateral and secondary bar apertures of each of said second secondary retraction bar lateral, and engages said second disk aperture.

4. The retractable enclosure recited in claim 1, further comprising at least one attachment mechanism to removably secure said retractable enclosure to said child car seat.

5. The retractable enclosure recited in claim 1, wherein said main enclosure is an insulating material.

6. The retractable enclosure recited in claim 1, wherein said screen enclosure is netting.

* * * * *